United States Patent

[11] 3,595,354

[72] Inventor Jean F.G.M.L. Charpentier
254 N Highland, Akron, Ohio 44303
[21] Appl. No. 836,862
[22] Filed June 26, 1969
[45] Patented July 27, 1971

[54] ONE-WAY CLUTCH COMPRISING WEDGING MEANS
19 Claims, 5 Drawing Figs.
[52] U.S. Cl. ..................................................... 192/45.1,
192/74, 188/82.8
[51] Int. Cl. ............................................... F16d 41/07
[50] Field of Search ........................................... 192/45.1,
74; 188/82.8

[56] References Cited
UNITED STATES PATENTS
| | | | |
|---|---|---|---|
| 1,946,048 | 2/1934 | Verderber | 192/45.1 UX |
| 684,478 | 10/1901 | Trimble | 192/45.1 |
| 2,785,782 | 3/1957 | Dodge | 192/45.1 X |
| 3,235,046 | 2/1966 | Fulton | 192/45.1 |
| 3,236,345 | 2/1966 | Dietz | 192/45.1 |

FOREIGN PATENTS
520,665  2/1921  France ........................ 188/82.8

Primary Examiner—Allan D. Hermann
Attorney—Oldham and Oldham

ABSTRACT: The invention relates to an overrunning clutch with extremely high response characteristics and very little backlash. Essentially, careful consideration of excentricity in wedges associated between a driving member and a driven member in combination with friction factor between the driving, driven, and wedge or cam surfaces achieves a highly efficient clutch. Preferably, a primary wedge or cam is associated with the secondary wedge or cam, with both cams urged into an actuating position causing a driving relationship between the driven member and the driving member. This driving relationship is overcome upon a reverse movement of the driving member or an overriding of the driven member, all occasioned because of the excentric characteristics defining the wedges or cams in association with excentric surfaces on the driven member cooperating with radial steps of lips so that the cams always rotate or remain in the same relative relationship to the driven member.

INVENTOR
JEAN F. G. M. L. CHARPENTIER

INVENTOR.
JEAN F.G.M.L. CHARPENTIER
BY
Oldham & Oldham
ATTYS.

INVENTOR.
JEAN F.G.M.L. CHARPENTIER
BY
Oldham & Oldham
ATTYS.

ONE-WAY CLUTCH COMPRISING WEDGING MEANS

This invention relates to an overrunning clutch concept in which the device locking together the driving and driven races are designed to allow them the following characteristics:

A. The total area of each series of the corresponding surfaces that the locking devices apply permanently on each one of the races has a magnitude of the same order as the total area of the active surface of the race on which it is applied.

B. The forces that the locking devices induce on the active surfaces of the races, when the driven race resists the motive action of the driving race, generate a uniform pressure distribution on the races' active surfaces, and therefore a uniform distribution of the induced tangential driving force.

The purpose of such specific characteristics is to provide a clutch, the components of which keep permanently the same initial configuration independently from the operational constraints they are subjected in respect to the induced forces and the angular velocity.

The operational constraints are applied under the following conditions:

A. The pressure developed between the active surfaces of the races and the corresponding surfaces of the locking devices, has a magnitude of the same order as that of the journal of a shaft on its bearing, and therefore prevents the components from local elastic, and a fortiori permanent deformation.

B. The uniformity of the pressure prevents the components from any change of configuration.

C. The locking devices operate without detectable motion relative to the driven race on which they are mounted and therefore compelled to rotate at the same angular velocity.

D. As no deformation and no relative motion can occur, the efficiency of the clutch is permanently equal to the theoretical value, and the low and uniform pressure set to work prevents the components from wear allowing them an indefinite life time.

E. Even if some wear could occur, it would never change the theoretical operating conditions because it would be uniform like the pressure distribution, so that the shape and the adaptation of the components under contact would remain homothetic to their initial configuration.

F. From condition E, no high accuracy is required from the machine work.

G. No high hard treatment is required for the metal utilized.

H. No considerable thickness for resisting the constraint's deformation is required from the outer race, because the pressure applied on is uniformly distributed.

For a better understanding of the invention reference should be had to the accompanying drawings wherein.

Figure 1:
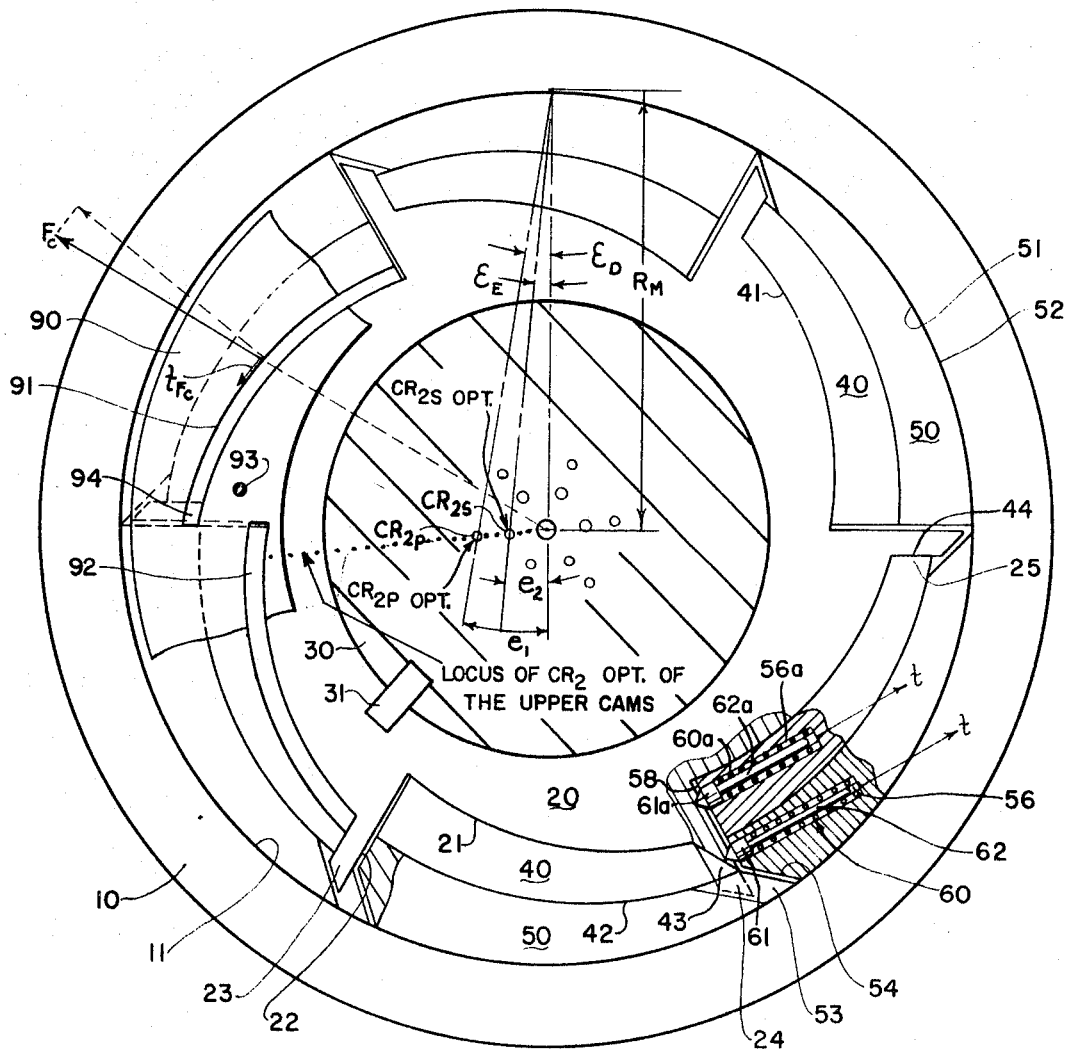
FIG. 1 is a transversal view, partially broken of an overrunning clutch with an external drive race.
Figure 2:
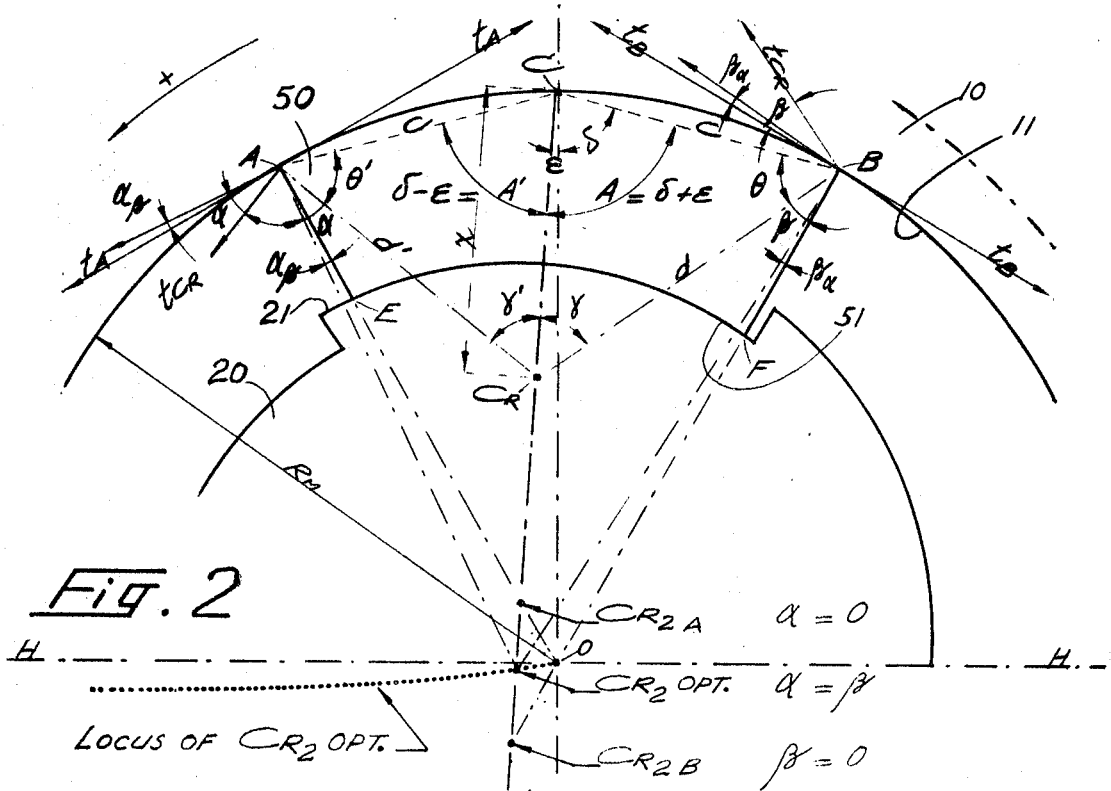
FIG. 2 illustrates the fundamental shape and the geometry of the locking devices, and the way to determine the optimum magnitude of their parameters to satisfy the conditions defined above.
Figure 3:
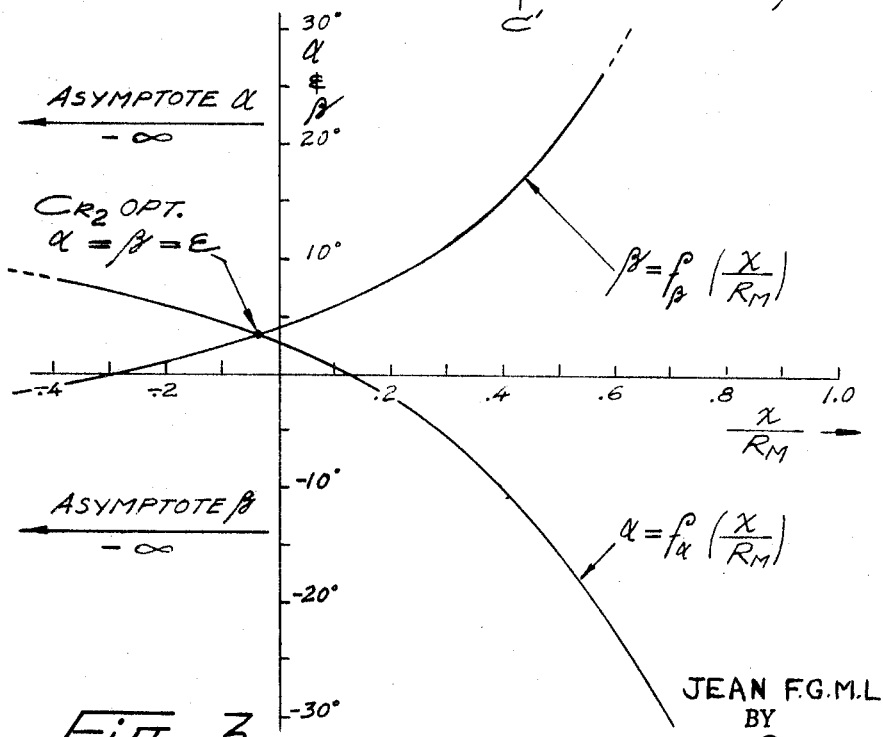
FIG. 3 represents the functions variation of the two main parameters.

To get the characteristics described above, an overrunning clutch corresponding to the invention is comprised of the components described as follows, and illustrated in FIGS. 1, 2, 4 and 5, while the parameters and the functions of two of them are illustrated in FIGS. 2 and 3.

In FIG. 1, the numeral 10 indicates a driving race, or motor race, comprising an internal cylindrical active, or motive or driving surface 11 with a circumferential profile, mounted externally with respect to the other clutch's components, for performing some rotary, continuous or oscillating motion, around a central longitudinal axis XX of trace O in the Figure.

A driven race 20 or receptor, coaxial with the driving race 10 and integral with or fixed by means of a key 31 on the driven shaft 30. The driven race 20 looks like a conventional Ratchet Wheel but with larger teeth which form a series of excentric partial cylindrical surfaces 21 with a circumferential arc profile, which constitute a series of spirals 21, all developing their opening in the same positive rotational direction. The surfaces 21 are convex because the driving surface 11 is external to the connecting mechanism. They are positioned facing the driving surface 11 of the motor race 10 at such a distance apart to constitute a series of partial excentric cylindrical primary annular spaces.

Each one of the surfaces 21 constitutes the bearing of a cam, their end is separated from the origin of the next by the radial step 22 which is prolonged by the lip 23 formed at the end of every bearing surface 21 and radially directed toward the driving surface 11.

Between the driving and driven races, a series of primary cams 40 are mounted which look like long curved wedges with each one of them having its base surface 41 permanently seated in coincidence on one of the bearing surfaces 21, or partial excentric surfaces of the driven race 20, and compelled therefore to rotate with it. The sum of the base areas 41 of the primary cams 40 has the same order of magnitude as the total area of the driven race's bearing surface on which they are seated.

The excentricity $E_B$ of the bearing's profile 21, which is identical for that of the primary cams' base profile $E_1$ is measured by the ratio of the distance $e$, extended between the general center of rotation O of the driving race 10 and the center of curvature, $CR_{2P}$(optimum), of said bearing's profile 21, to the radius $R_M$ of the motor race's driving surface 11, or $E_B = E_{p_1} = \frac{e_1}{R_M}$. This ratio measures the tangent of the "Angle of Disengagement $\xi_D$" such that $\frac{e_1}{R_M} = \tan \epsilon_D$. The numerical value of $\tan \xi_D$ is greater than that of the friction coefficient, $f$, of the friction developed between the bearing surfaces 21 and the base surfaces 41 of the primary cams 40. The excentricity of the bearings' profile 21 and primary cams 40 base profile 21, satisfies the condition $E_B = E_{p_1} = \frac{e_1}{R_M} = \tan \epsilon_D > f$.

A guide 43 is formed at the front end of the primary cams 40 which engages in a split 24 formed in the lip 23 of the bearing 20. The head surfaces 42 of the primary cams 40, facing at a distance apart the active surface 11 of the motor race 10, constitute a new series of partial excentric secondary annular spaces, while their circumferential profiles constitutes a new series of secondary spirals, all developing their opening in the same positive rotational direction. The excentricity $E_{p_2}$ of the primary cams 40 head profile 42 is measured by the ratio of the distance $e_2$ extended between the main center O and the center of curvature $CR_{2_s}$OPT of the primary cams head profile 42 to the radius $R_M$ of the motor race profile 11, or $E_{p_2} = \frac{e_2}{R_M}$. This ratio measures the tangent of the "Angle of Engagement $\xi_E$" such that $e_2/R_M = \tan \xi_E$. The numerical value of $\tan \xi_E$ is smaller or at most equal to the friction coefficient $f$, specific of the friction developed between the contacting surfaces to satisfy the condition $E_{p_2} = \frac{e_2}{R_M} = \tan \epsilon_E < f$.

A series of secondary cams 50, each one mounted inside one of the partial excentric secondary annular spaces, with their base surface 52 permanently seated in coincidence on the head surface 42 of a corresponding primary cam 40. The excentricity of their base contour $E_{B_1}$ is identical to that $E_{p_2}$ of the second series of spirals constituted by the head profiles 42 of the primary cams 40, i.e. $E_S = E_{p_2} = \frac{e_2}{R_M} = \tan \epsilon_E < f$. The secondary cams 50 are compelled to rotate with the primary cams 40 and the driven race 20 at the same angular velocity.

The sum of the base areas of all the secondary cams has the same order of magnitude as the sum of all the areas of the head surfaces of the primary cams on which they are applied.

The head surfaces 52 of the secondary cams 50 are applied on the driving surface 11 of the motor race 10 and the sum of all their areas has the same order of magnitude as the total area of the driving surface 11. On the front side of the secondary cams 50 is formed a guide 53 which engages in a split 24 formed on the lip 23 of the bearings 20 and in a notch 54 formed on the rear face of the preceding cam of the same series. A positive permanent tangential force, $t$, is transmitted to each cam of both primary and secondary series. The tangential force is generated by an energizing helicoidal spring 60 entirely located inside a cylindrical guide 56 machined in, and through the rear side 58 of the secondary cam 50.

A piston 61 with a cylindrical tail 62 is mounted in the cylindrical guide 56 to seal its orifice. The tail of the piston is mounted inside the spring 60 to allow it an internal guide while the piston head take support on the front face 22 of the lip 23 of the driven race 20. The piston's tail does not contact the bottom of the cylindrical guide 56 so that the positive spring's tension t is entirely transmitted to the cam 50. Each primary cam 40 is provided with a cylindrical guide or bore 56a. A coil spring 60a is provided within each of the guides 56a. A piston 61a with a cylindrical tail 62a is mounted in the cylindrical guide 56a with the tail of the piston inside the spring 60a to allow it to act as an internal guide. The head of the piston 61 abuts the front face 22 of the lip 23 of the driven raise 20 so that the spring 60a exerts the positive tangential force $t$ on the primary cam 40.

The positive tangential force $t$ transmitted to the primary cams 40 maintain their front side 44 applied on the rear face 25 of the lip 23 in order to prevent any positive relative displacement from their assigned initial position.

The positive tangential force $t$ transmitted to the secondary cams 50 maintain them engaged in contact between their bearing primary cam's head surface 42 and the internal driving surface 11 of the driving race 10 while nothing prevents their relative displacement.

Both the primary cams 40 and the secondary cams 50 are applied on their adjacent surface under the pressure magnitude required to generate on their active surfaces the Initial Permanent Inductive Tangential Connecting Forces, or in shortening, the "Priming Inductive Forces."

Through this concept, when the driven race resists the driving race motive action, the Priming Inductive Forces always convert the tangential components of the opposed forces into the Tangential Components of an Induced Connecting Force when the magnitude of the angle of engagement $\xi$ is correctly selected. In this case, the induced tangential driving component applied on the head 52 of the secondary cam 50 by the driving surface 11, and the induced tangential resisting component applied on the base 41 of its supporting primary cam 40 by the bearing surface 21 form a couple which tends to engage at once and as one cam alone, each pair of associated primary and secondary cams between their adjacent active surfaces. As the primary cams 40 are prevented by the lips 23 of their bearings 20 from moving forward with respect to the driven race 20, they behave relatively to the secondary cams 50 like an integral part of the driven race's bearing, and only the secondary cams 50 can respond to the action of the induced tangential connecting force's components. Because their base contour is excentricity, $E_{s_1} = \frac{e_2}{R_M} = \tan \epsilon_E < f$ their base contour is smaller than the magnitude of the friction coefficient $f$ specific of the friction developed between the contacting surfaces the connecting forces wedge the secondary cams 50 between the driving race 10 and the driven race 20 through the primary cams 40 then integral part of the driven race 20. The driven race 20 is then blocked on the driving race 10 and compelled to rotate at the same angular velocity.

In the opposite case, when the driven race starts to rotate faster than the driving race in the positive direction, the tangential resisting force initially applied on it, changes sign and tends then to disengage the cams from wedging on their adjacent surfaces. In this positive fast rotational motion of the driven race, the primary cams are not prevented from any trend of backwards relative displacement. Because the magnitude of their base profile excentricity $Ep_1$ is greater than the friction coefficient, $f$, of their adjacent surfaces $Ep_1 = e_1/R_M = \xi_D$ $< f$ it allows to each pair of associated primary and secondary cams, to disengage together at once as a block from the bearing surface 21 of the driven race 20, without the smallest resistance. A good magnitude for the angle of disengagement, $\xi_D$, when both cams of each series are made in the same material, is $\tan \xi_D = 2 \tan \xi_E$, or twice the magnitude of the engagement angle $\xi_E$, so that the primary cams 40 engage between the bearing surfaces 21 and the secondary cams' 50 base surfaces 51 under the same conditions as the secondary cams engage between the driving surface 11 and the primary cams' head surface 42. The condition, $\tan \xi_D = 2 \tan \xi_E$ is not limitative, but optimum.

During the phase of disengagement both primary cams 40 and secondary cams 50 are continuously applied on their corresponding active surfaces 21 of the driven race 20 and driving race 10, under the inducing pressure of their energizing spring 60 in the same permanent attitude relative to said active surfaces 11 and 21, therefore permanently ready to clutch again.

The cams are protected against the action of the centrifugal force by means of two guides 90 located on each side of all the cams 40 and 50, but partially illustrated only for the cams 40, with an opening having two parallel circumferential contours 91 and 92 of the same center as the cam base profile. A corresponding flange 94 machined on each side of the cam's is able to slide in the opening taking its support from the upper surface of the opening. The relative displacement of the cams is not prevented as the opening is extended further in the front and rear of the cams. The centrifugal force $FC$ is balanced by the guides' reaction while it generates on the cams' profile a positive component $t_{Fc}$ which pushes the cam in the positive direction and operates therefore in the same manner as the energizing springs 60. The guides are fixed on the driven race 20 by means of rivets 93.

It has been explained and illustrated how, in this clutch the active surfaces of all the components have their total area set to work at once. It will be now established how the pressure is uniformly distributed on these active areas.

In FIG. 2, is diagrammatically illustrated an overrunning clutch with a single cam 50 interposed between the active area 11 of the motor race 10 and the bearing surface 21 of the driven race 20. The center of curvature CR common to the surface profile 21 of the bearing and to the base profile of the cam 50 is located on the straight line, $CC'$, drawn from the point C located at the middle of the length, $\widehat{AB}$, of the cam 50, and which represents the trace of the generatrix of the cam's head surface containing the center of pressure. The line $CC'$ forms the angle of engagement $\xi_E$ with the corresponding radial direction OC. The straight line $CC'$ is the locus of all the centers of curvature corresponding to one value of the angle of engagement $\xi_E$, for the profile common to the bearing surface 21 and to the base 51 of the cam 50.

The point C corresponds to a vanishing immaterial cam reduced to the point C itself. Assume that center of curvature located to any position, using CR as an example. The distance $CC_R = X$ is then selected as the independent variable. When the arc of profile $\widehat{AB}$ of the cam 50 tends to rotate around the center CR, the point A, trace of the cam's leading edge tends to leave the profile of the driving surface 11 under the negative angle of disengagement, $\alpha$, while the point B trace of the cam's trailing edge, tends to penetrate the profile of the driving surface 11, under the positive angle of attack $\beta$.

The geometrical characteristics of the cam are as follows:
The relative length of its profile; ratio of the arc $\widehat{AB}$ to the radius $R_M$ of its driving surface 11, $1_r = \widehat{AB}/R_M$. The relative average thickness; ratio of one-half the sum of its ends' heights, $\overline{AE}$ and $\overline{BF}$, to the radius $R_M$ of the driving surface 11, $tr = (\overline{AEBF})/2R_M$. The mechanical parameter of the cam is the excentricity of its base profile $E = \frac{e}{R_M} = \tan \xi$, the magnitude of which depends upon the nature of the cams' function.

From the geometry shown in FIG. 2, the angles of attack $\alpha$ and $\beta$ have been expressed as functions of the distance X of the center of curvature, CR, to the point trace C, apex of the angle $\xi$, and the angles of the triangles of interest which are depending also of the magnitude of the excentricity, or the angle $\xi$. The functions are as follows:

$$\tan \alpha = \frac{\left(\frac{c}{r} - \cos A'\right) \tan \delta - \sin A'}{\sin A' \tan \delta + \frac{c}{r} - \cos A'}$$

$$\tan \beta = \frac{\left(\frac{c}{x} - \cos A\right) \tan \delta - \sin A}{\sin A \tan \delta + \frac{c}{x} - \cos A}$$

The form of these equations shows that it is possible to satisfy the condition $\tan \alpha = \tan \beta$ for a compatible magnitude of the variable $c/x$, which depends upon the geometrical characteristics defined above and upon the parametric angle $\xi$. These functions give the answer with high accuracy and few computations. More spectacular functions, illustrated in FIG. 3 are obtained in expressing $\tan \alpha$ and $\tan \beta$, with $X/R_M$ for the independent variable. These functions show that the corresponding center of curvature denoted $CR_2$ (optimum), is located in respect to point C on the other side of the transversal diameter HH, normal to the radial direction.

The cam 50 which has point C for both center of curvature and instantaneous center of oscillation does not tend under the engagement process to attack from one end while leaving from another end, the active surface 11 of the driving race. Because the equality of the angles of divergence, $\alpha = \beta = $ constant, is satisfied all over the active surface 52 of the cam 50, this latter tends to penetrate uniformly by a translation motion, through the driving surface 11 of the motor race 10 and applies on a pressure which is therefore uniformly distributed.

For the associated upper primary cam 40 and secondary cam 50, the locus of this privileged center $CR_2$ (optimum), expressed as a function of the parametric angle $\xi$, is a line extended from the central point O in the left direction, under the diameter HH normal to the radial direction OC joining the center O to the profile view C of the center of pressure of the secondary upper cam 50. The fraction of locus comprised in the interval $\overline{OCR_2}$ (optimum) corresponds to the cams able to automatically engage between their adjacent active surfaces. The relative magnitude of this distance is $$\epsilon = \frac{\overline{OCR_2}(\text{optimum})}{R_M} = f,$$

is equal to the friction coefficient $f$ of the contacting surfaces. Consequently for every nature of surface this length is different but the point $CR_2$ (optimum) defined the same boundary beyond which the corresponding cams require an external force to engage.

With the explanations given above, it is possible to see how under these operating conditions the clutch's components operate without deformation and therefore, without change of configuration. The passage between the engagement and disengagement phases results in a respective increase or decrease of pressure between the contacting area and without relative motion between the cams and their bearing surfaces. It is a characteristic of this clutch that to allow the components a possibility to move is a sufficient condition for their operating without performing the smallest displacement.

The above properties result in the following facts:

A. The Induced Forces are always proportional to the magnitude of the inducing forces, a condition which satisfies the Stability Criterion of the torque and motion transmission.

B. The cams permanently operate under the same engaging angle, i.e. with a constant maximum efficiency.

Figure 4:
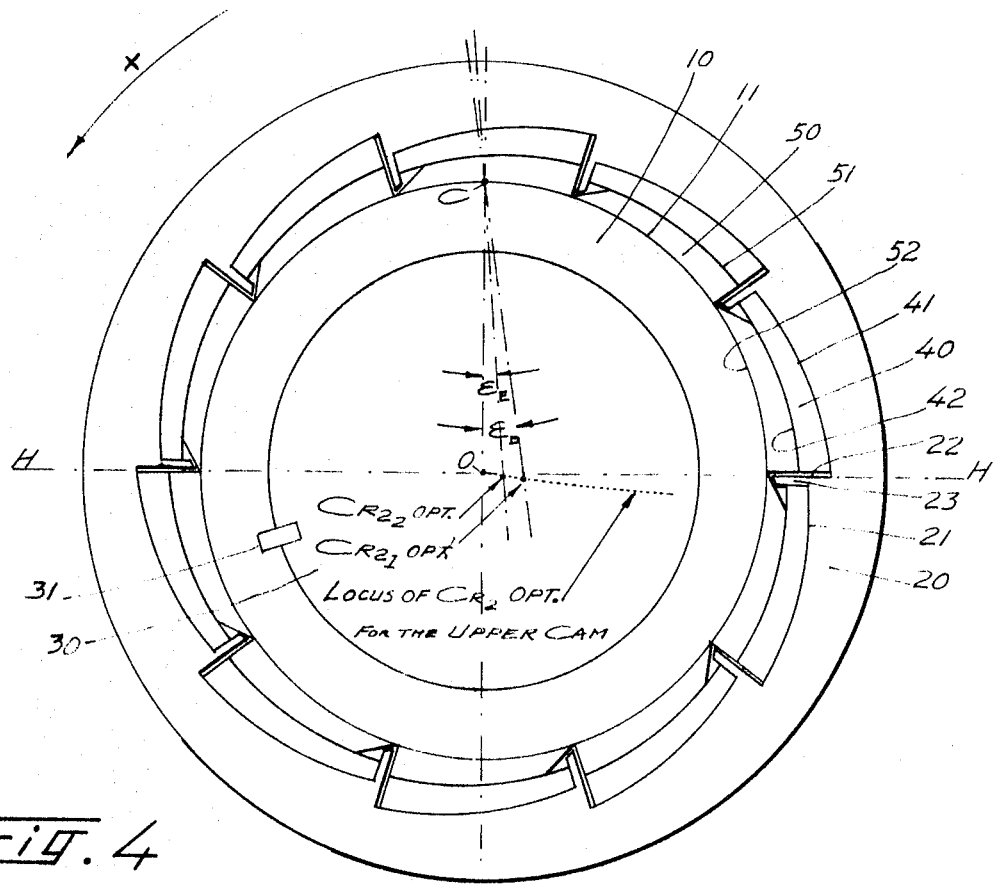
FIG. 4 is a transversal view of an overrunning clutch with an internal driving race.

In FIG. 4 is illustrated an overrunning clutch where the internal race 10 is the driving member, which is integral with the driving shaft 30, or fixed on by means of a key 31. A series of secondary cams 40 with a shape similar to that of the primary cams 40 is distributed around with their head surfaces 52 all applied on the driving surface 11. Their base surfaces 51 are permanently seated on the heads' surface 42 of a second series of primary cams 40 the base surfaces 41 of which are permanently seated in coincidence on the bearing surfaces 21 of the driven race 20. All the contacting surfaces of the cams 40 and 50 and of the bearings 20 are concaves. The bearing surfaces 21 are separated one from the other by the radial step 22 which is prolonged by the lip 23 radially directed towards the driving surface 11.

The instantaneous centers of oscillation and curvature of the cams' and bearings' surfaces are, in this concept, all located to the right side of the central axis of rotation O, and the locus, for each cam, of the Center Optimum, $CR_2$ (optimum), is extended from the point O in the right direction, with a position about symmetrical of that shown for the corresponding upper cams of the overrunning clutch of FIG. 1.

Figure 5:
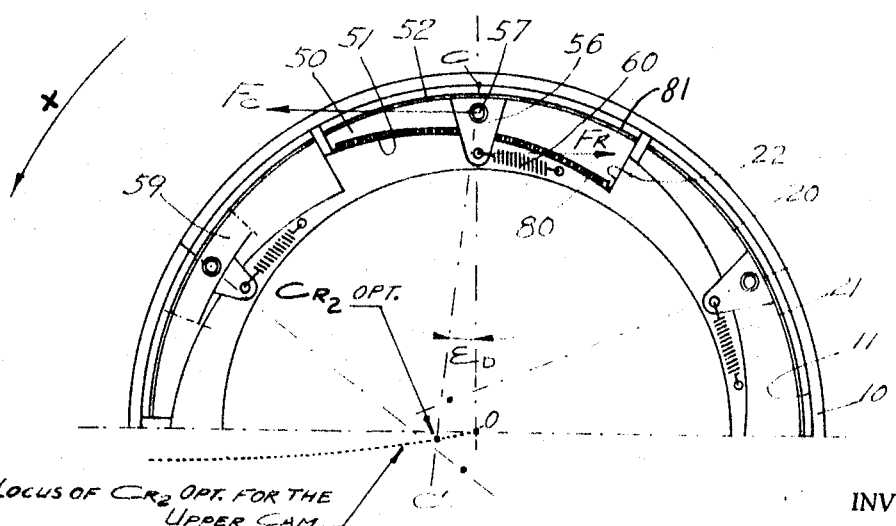
FIG. 5 illustrates the application of the overrunning clutch principle to the nonautomatically controlled clutches and brakes.

FIG. 5 illustrates the use of single cams 50 with the center of curvature and oscillation $CR_2$ (optimum) corresponding to the angle of disengagement $\xi_D$.

The driving member is a drum 10 rotating around a central axis of trace O. Each cam 50 is mounted articulated on an axle 57 which is supported by a pair of flanges or collecting means 59 located one on each side of the cams 50. The flanges 59 are acting at once, as a guide which maintain the cams 50 in alignment, as an actuator transmitting to the cams 50 an external tangential force Fc, and as a synchronizer which transmit to all the cams 50 a simultaneous angular displacement. The cams 50 can then be used as brake shoes. The cams 50 are supported by a fixed member, or fixed race 20 on which is seated their base surface 51. The head surface 52 of the cams 50 comprise a brake lining 81 which allows a large friction coefficient, $f$, therefore a large angle $\xi_D$. Some rolling device 80 can be interposed between the bearing surfaces 21 and the cams' base surface 51, for the sole purpose of reducing the magnitude of the angle of disengagement $\xi_D$. A recalling spring 60 maintain at rest the rear side of the cams 50 applied on the front face of the radial step 22. To drive the cams 50 in operation requires the application of a tangential force Fc on the cams' articulation 57, through an infinitely small angular displacement of the flanges—actuators 59.

The embodiment of FIG. 5 could also be a clutch by converting fixed member 20 to a rotatable driven member.

While in accordance with the patent statutes only a certain representative embodiment has been illustrated and described in detail, it is to be understood that the invention is not limited thereto or thereby, but that the inventive concept is defined in the appended claims.

What I claim is:

1. An overrunning clutch, comprising:
   a first race formed for connection with a rotatable member, having a central longitudinal axis, and defining a cylindrical active surface with a continuous circumferential profile;
   a second race coaxially mounted with the first race, integral with a second member, having a series of excentric partial cylindrical surfaces each with a circumferential arc profile constituting a series of spirals, all developing their openings in the same direction, and with such surfaces constituting a series of bearing surfaces positioned facing the active surface of the first race at such a distance apart to constitute a series of excentric partial cylindrical primary annular spaces, the end of each of said primary annular spaces being separated from the origin of the next by a radial step prolonged by a lip formed at the end of every primary annular space which is radially directed toward the active surface of the first race;
   a series of primary cams shaped as long curved wedges, one primary cam being mounted inside each of the annular spaces with the thickened end of the cam substantially against the radial step of the space and the first side thereof seated in coincidence on the bearing surface of the second race;
   a series of secondary cams shaped as long curved wedges, one secondary cam being mounted inside each of the annular spaces with the thickened end of the cam substantially against the radial step of the space, the first side of each secondary cam having the same profile and average excentricity as the second side of the primary cam, and the second side of each secondary cam having an active surface in substantially adjacent concentric alignment with the active surface of the first race; and means urging the thin end of each cam toward the rear side of the lip of the adjacent annular space.

2. A clutch according to claim 1 which includes key guides at the end of each cam to insure their alignment with respect to the races and each other during rotative movement thereof.

3. A clutch according to claim 1 which includes spring means associated with each primary and secondary cam urging said cams toward their thin ends thereby normally providing a wedged engaging relationship of the cams between the first race and the second race.

4. A clutch according to claim 3 where the numerical value of the tangent of the angle of disengagement of the primary cams to the second race is greater than the friction coefficient developed between such surfaces, and where the numerical value of the tangent of the angle of engagement of the primary cams to the secondary cams is not greater than the friction coefficient developed between such surfaces.

5. A clutch according to claim 1 where the average excentricity of each primary cam active surface is equal to the tangent of the angle formed by the radius of their profile and the radius of the driving surface profile which meet each other at the middle length of the profile of the cams driving surface.

6. A clutch according to claim 5 where the sum of the base areas of all the secondary cams is substantially of the same magnitude as the total areas of the driving surfaces of the primary cams.

7. An overrunning clutch comprising
   a. A driving race formed for connection with a motor for rotary, continuous or oscillating motion, having a central longitudinal axis, and defining a driving cylindrical active surface with a continuous circumferential profile,
   b. A driven race coaxially mounted with the driving race integral with the driven member having a series of excentric partial cylindrical surfaces each with a circumferential arc profile constituting a series of spirals, all developing their opening in the same direction with the excentric partial cylindrical surfaces constituting a series of bearing surfaces, positioned facing the driving surface of the driving race at such a distance apart to constitute a series of excentric partial cylindrical primary annular spaces with the end of each one of said primary annular spaces separated from the origin of the next by a radial step prolonged by a lip formed at the end of every primary annular space which is radially directed toward the driving surface, with the average excentricity of the profile of the primary annular space equal to the tangent of the angle formed by the radius of their profile and the radius of the driving surface profile, which meet each other at the middle length of the profile of the primary annular space,
   c. A series of primary cams mounted each one inside one of the excentric primary partial annular spaces shaped as long curved wedges with their base surface permanently seated in coincidence on the bearing surface of their excentric annular space and having therefore the same profile and the same average excentricity which is equal to the tangent of the angle of disengagement of said primary cams, for which the center of curvature is also the instantaneous center of oscillation, the sum of the base areas of all the primary cams having the same order of magnitude as the total area of the driven races bearing surfaces on which they are seated, said primary cams mechanically rotating with the driven race, spring means urging the front end of each primary cam toward the rear side of its own bearing's lip, the primary cams' head surface facing the active surface of the driving race at such a distance apart so as to constitute a series of secondary excentric partial cylindrical annular spaces, the average excentricity of the primary cams' head surface profile equal to the tangent of the angle formed by the radius of their profile and the radius of the driving surface profile which meet each other at the middle length of the profile of the cams' head surface, and
   d. A series of secondary cams mounted each one inside one of the excentric secondary partial annular spaces, looking like long curved wedges, with their base surface permanently seated in coincidence of the head surface of one of the primary cams, having substantially the same profile and the same average excentricity equals to the tangent of the angle of engagement of said secondary cams, for which the center of curvature is also the instantaneous center of oscillation, the sum of base areas of the secondary cams being substantially the same as the total areas of the head surfaces of the primary cams, and the sum of the head areas of all the secondary cams being substantially the same as the total area of the driving surface of the motor race.

8. A clutch according to claim 7 which includes means to protect the cams against the direct action of centrifugal force by utilizing a fraction of the centrifugal force to tangentially energize the cams in the positive direction, wherein the centers of curvature, for the bearing surface profiles and the cams' base and head profiles are located toward the general axis of rotation on a straight line which forms at the point median of the head profile of the cam seated on the driving surface the selected angle of engagement or disengagement, with the radius of the driving surface of the driving race, and which includes small pistons cooperating with the spring means to prevent direct engagement of the spring means with the radial steps and lips.

9. An overrunning clutch comprising a first race formed for connection with a rotatable member having a central longitudinal axis and defining a cylindrical active surface with a continuous circumferential profile, a second race coaxially mounted with the first race and designed to be integral with a second member, said second race having a series of excentric partial cylindrical surfaces each with a circumferential arc profile constituting a series of spirals, all developing their opening in the same direction, and with such surfaces constituting a series of bearing surfaces positioned facing the active surface of the first race at such a distance apart to constitute a series of excentric partial cylindrical primary annular spaces, the end of each of said primary annular spaces separated from the origin of the next by a radial step prolonged by a lip formed at the end of every primary annular space which is radially directed towards the active surface of the first race, a series of cam means shaped as long curved wedges mounted each one inside one of the annular spaces with their thickened end substantially against the radial step of the space and the length thereof seated in coincidence on the bearing surface of such annular space, and each having the same profile and the same average excentricity, said cam means mechanically rotating with the second race, spring means urging the thin end of each cam means toward the rear side of the lip of the adjacent annular space, said cam means having active surfaces in substantially adjacent concentric alignment and normally urged into engagement with the active surface of the first race, and said cam means being pivotally mounted independently of said first race at about the central point of their length upon an axis substantially parallel to the central longitudinal axis thereof, and means to selectively control pivotal action of such cam means to control the engagement thereof with the first race.

10. An all mechanical automatic overrunning clutch comprising:
    a driving race coaxially mounted to a motor member rotating around a main central longitudinal axis, with said driving race comprising a cylindrical active surface;
    a driven race fixed to a receptor member coaxially mounted with respect to the driving race, with said driven race comprising a series of partial cylindrical excentric surfaces having an identical circumferential arc profile for constituting all together a circular series of spirals developing their opening in the same direction, with said partial cylindrical excentric surfaces constituting a series of bearing surfaces facing in spaced relation the active cylindrical surface of said driving race for determining between their own surface and said driving race surface a series of partial, excentric, cylindrical annular spaces, with both ends of each one of said bearing surfaces of the driven race separated from the surfaces of the adjacent bearings, a pair of superposed primary and secondary cam means substantially similarly shaped like long curved wedges mounted inside each one of said partial excentric cylindrical annular space, with the inner superposed contacting surfaces of said primary and secondary cams means having an identical profile to allow them a relative free sliding motion, with each pair of primary and secondary cam means inserted like one unique cam inside their own annular space with the outer surface of said primary cam means permanently contacting the bearing surface of the driven race and with the outer surface of said secondary cam means permanently contacting the active surface of the driving race, with the absolute excentricity of the profile of said primary cam means greater than the absolute excentricity of the profile of said secondary cam means; means to limit the movement of each primary cam relative to the driven race in the direction of positive movement, said secondary cam being limited in its movement by the wedging action between the primary cam and the driving race, means urging each said primary cam means positively in contacting engagement with the means to limit, and means urging each secondary cam means in the positive direction.

11. A clutch according to claim 10 where the means urging the primary and secondary cam means are individual springs means with said spring means received inside a cylindrical cavity formed inside said primary and secondary cam means and mounted on some appropriate guides with one end comprising a piston with a small part of which is coming out of the thicker end of the cam for taking support on the frontal face of the rear separator of the annular spaces of said cam means.

12. A clutch according to claim 10 which includes key guides at both ends of each cam means to insure their alignment with respect to the symmetrical plane of the races and with each other during rotative movement thereof.

13. A clutch according to claim 10 where:
the maximum excentricity of the profile of the active surface of said primary cam means which is seated in coincidence on the driven race bearing passive surface, can be expressed by the tangent magnitude of the angle formed by the intersection of the radius of curvature of their profile with the radius of curvature of the profile of the active surface of the driving race located at the middle length of its corresponding secondary cam surface profile which permanently contacts said driving race surface;
the minimum excentricity of the surface profile of said primary cam means is equal to the maximum excentricity of the surface profile of said secondary cam seated on it and can be expressed by the tangent magnitude of the angle formed by the radius of curvature of the common profile of their coinciding surfaces with the radius of curvature of the profile of the active surface of the driving race, located at the middle length of its corresponding secondary cam surface profile which permanently contacts said driving race surface.

14. A clutch according to claim 13 where the magnitude of the tangent of the maximum eccentricity of the primary cam means is equal to the tangent of the disengagement angle and can be greater than the friction coefficient developed between the contacting surface, and where the magnitude of the tangent of the minimum excentricity of said primary cam means is equal to the tangent of the engagement angle and can be smaller than the friction coefficient developed between the contacting areas.

15. A clutch according to claim 10 where the sums of all the contacting areas between the active surfaces of the primary cam means and the coinciding receptive bearing surfaces of the driven race, between both the active surfaces of the secondary cams means and the coinciding receptive surfaces of the primary cam means, and between the receptive surface of the secondary cam means and the coinciding active surface of the driving race, are substantially of the same magnitude.

16. A nonautomatic wholly mechanical clutch comprising a driving race coaxially mounted to a motor member rotating around a main central longitudinal axis, with said driving race comprising a cylindrical active surface, a driven race fixed to a receptor member coaxially mounted with respect to the driving race, with said driven race comprising a series of partial cylindrical excentric surfaces having an identical circumferential arc profile and constituting all together a circular series of spirals developing their opening in the same direction, with said partial cylindrical excentric surfaces constituting a series of bearing surfaces facing in spaced relation a part of the active cylindrical surface of said driving race for determining between their own surface and said driving race surface a series of partial, excentric cylindrical annular spaces, with both ends of each one of said bearing surfaces of the driven race separated from the surfaces of the adjacent bearings, a pair of primary and secondary cams means cooperating together like one unit to have only one same engaging and disengaging angle the tangent of which is greater than the friction coefficient developed between the contacting areas so that said cam means cannot operate by themselves, elastic means normally urging the receptive surface of said cam means out of contact with the active surface of the driving race and permanently urging the thicker end of said cam means in the negative rotational direction, means to limit the movement of each primary cam relative to the driven race in the direction of positive movement, means to provide an external tangential force which in first action overcomes the negative and permanent action of said elastic means urging the thicker end of the cam means in the negative direction in contacting engagement with the means to limit, and which in second action causes the cam means to run up on the driven race bearing surfaces to engage the receptive surfaces of the cam means with the surface of the active driving and with said engaging action vanishing with the withdrawal of the external force.

17. The nonautomatic mechanical clutch as described in claim 16 where means are interposed between the gliding surfaces of the cam means and the surface of the driven race to minimize the resistance to engaging and disengaging motion.

18. The nonautomatic mechanical clutch as described in claim 16 where said driven race is mounted fixed so that said nonautomatic clutch acts as a brake with said collecting means permitting control by means of an external force the engagement of the cam means with the driving race.

19. The nonautomatic mechanical clutch as described in claim 16 where said cam means are pivotally mounted at a selected location of their length upon one axis substantially parallel to the central longitudinal axis of the clutch, with all said axis for pivoting motion of the cam means mounting on a collecting means, and where elastic means are provided between said pivotal axis and the collecting means to allow said cam means to perform a double circumferential and radial displacement without constraint.